UNITED STATES PATENT OFFICE.

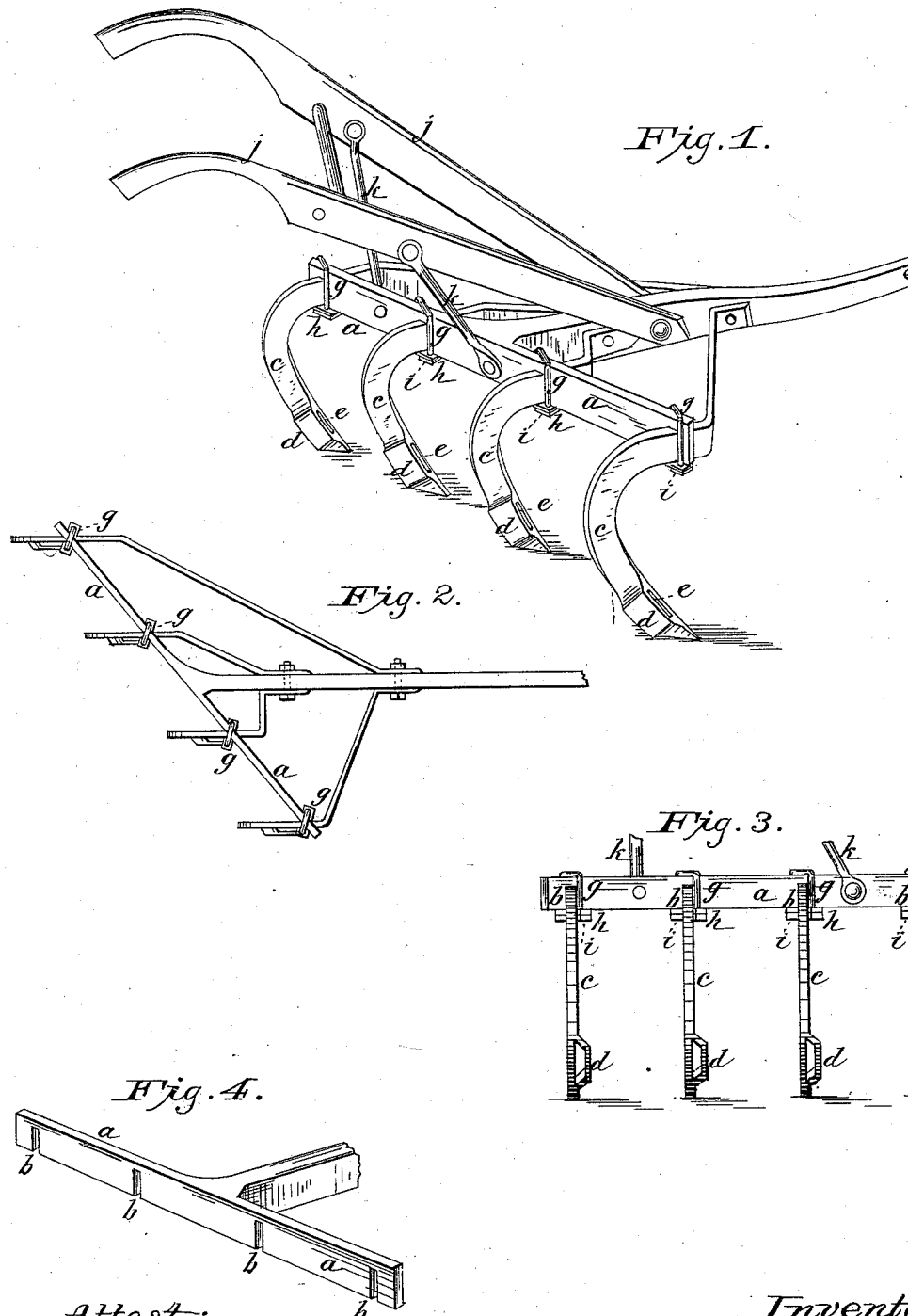

JOHN J. MIZE, OF PELHAM, GEORGIA.

CULTIVATOR.

SPECIFICATION forming part of Letters Patent No. 264,323, dated September 12, 1882.

Application filed June 27, 1882. (No model.)

*To all whom it may concern:*

Be it known that I, JOHN J. MIZE, a citizen of the United States, residing at Pelham, in the county of Mitchell and State of Georgia, have invented new and useful Improvements in Cultivators, of which the following is a specification.

In my improved cultivator the beam and a diagonal cross-bar at its handle end are cast in one piece, and the curved shovel-carrying standards are secured in vertical open notches in the under side of said diagonal cross-bar, so as to stand in parallel relation to the beam, extending horizontally from the curved standards behind the diagonal bar to a point in advance thereof, from which they are bent inward in the same plane, so as to join the beam at opposite points on both sides, making a strong, durable, and cheap construction, in which the shovels stand in a parallel range with the diagonal bar, giving an easy draft in loosening the soil between the rows of corn and making it easy to handle the cultivator. Such a cultivator is shown in the accompanying drawings, in which—

Figure 1 represents a view in perspective; Fig. 2, a top view, the handles being removed; Fig. 3, a rear view, and Fig. 4 a section of the beam and its notched diagonal cross-bar in perspective.

The handle end of the beam is cast with a cross-bar, $a$, having a diagonal relation thereto about thirty-four inches long and projecting equally on each side thereof, and forming on the right side an acute angle and on the left side an obtuse angle. Notches $b$ are cast in the diagonal bar $a$ about eight inches apart, each open at its lower edge, their vertical walls being in planes parallel with the beam. This gives a very simple frame for a very advantageous arrangement of the shovel-carrying standards. These standards are formed of wrought-iron bars, the lower end of the curved part $c$ having a box-plate, $d$, secured to its right side, to form a slotted box-seat projection, $e$, to and upon which the shovel or mold-board is secured by a bolt or bolts passing through it and the slot of the box, and bound by a nut clamped against the rear side of the box and standard. The slotted box forms a flush seat with the front edge of the standard and allows the shovel or mold-board to be set down as it wears away. The neck of the curved standard is horizontal about four inches, and has a thickness and width just to fit into and fill the notch $b$ in the diagonal beam-bar $a$ and make a flush joint with its lower edge.

The standards are inserted into the notches from the under side of the bar, and secured therein by clips $g$, placed vertically over the bar on each side of the neck of the standard, and a tie-bar, $h$, clamped by nuts $i$ against its under edge, so as to bind it against the upper end of the notch. As the clip-fastening merely serves to hold the standard-bar in the notch, it may be cheaply formed of round iron, as there is no strain upon it, the pressure and strain upon the standard being borne entirely by the diagonal beam-bar. The standard-bars thus secured in the notches of the diagonal bars, parallel to the beam, are firmly supported laterally, while their connection with the beam is made by bolting their forward projecting ends to it by the same screw-bolts and nuts at different points in advance of the diagonal bar—that is, the two end standard-bars are bent inward and bolted at about the middle of the beam, and the two middle standard-bars are similarly bent and secured to the beam nearer its diagonal bar. This construction gives a bracing support by each standard-bar to the diagonal beam-bar, and the latter braces the standards.

The handles $j$ are secured to the beam and supported by braces $k$, bolted to the diagonal bar.

The disposition of the standards and their equal projection in rear of the diagonal beam-bar gives a central draft; and the cheapness and durability of the cultivator are important objects in such implement. The plow-standards can be detached, so as to use two or four, as may be required.

I claim—

1. The beam cast with a diagonal cross-bar, $a$, at its handle end, with notches $b$, open at its under edge, as described, in combination with the standard-bars and the clips for clamping them within the said open notches, as specified.

2. The combination, in a cultivator, of the beam cast with a diagonal cross-bar, *a*, at its handle end, having notches *b*, open at its under edge, with the curved standard-bars bolted to the beam, and means, substantially as described, whereby they are secured within said open notches of said diagonal bar, as shown and described.

In testimony whereof I have hereunto set my hand in the presence of two subscribing witnesses.

JOHN J. MIZE.

Witnesses:
J. W. C. CRITCHELL,
C. LIGHTFOOT.